United States Patent
Carpenter et al.

(10) Patent No.: US 11,879,394 B2
(45) Date of Patent: Jan. 23, 2024

(54) SHUT OFF VALVES AND COMPONENTS THEREOF FOR ECOLOGY FUEL RETURN SYSTEMS

(71) Applicant: Hamilton Sundstrand Corporation, Charlotte, NC (US)

(72) Inventors: Richard J. Carpenter, Gales Ferry, CT (US); Leo J. Veilleux, Jr., Wethersfield, CT (US); Lubomir A. Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/510,744

(22) Filed: Oct. 26, 2021

(65) Prior Publication Data

US 2022/0042459 A1    Feb. 10, 2022

Related U.S. Application Data

(60) Division of application No. 15/990,079, filed on May 25, 2018, now Pat. No. 11,174,791, which is a
(Continued)

(51) Int. Cl.
*F02C 7/232* (2006.01)
*F16K 31/20* (2006.01)
(Continued)

(52) U.S. Cl.
CPC .............. *F02C 7/232* (2013.01); *F16K 31/20* (2013.01); *F16K 31/26* (2013.01); *F16K 39/02* (2013.01); *F16K 39/022* (2013.01)

(58) Field of Classification Search
CPC .......... F02C 7/212; F16K 31/20; F16K 31/26; F16K 39/02; F16K 39/022
See application file for complete search history.

(56) References Cited

U.S. PATENT DOCUMENTS

| 276,355 | A | * | 4/1883 | Clarke | .................... F16K 31/26 137/122 |
| 315,467 | A | * | 4/1885 | Brandt | .................... F16K 31/22 137/433 |

(Continued)

FOREIGN PATENT DOCUMENTS

| EP | 2204595 A1 | 7/2010 |
| EP | 2549159 A1 | 1/2013 |

(Continued)

OTHER PUBLICATIONS

United Kingdom Search Report for Great Britain Patent Application No. GB1606555.9, dated Sep. 29, 2016.

*Primary Examiner* — Patrick C Williams
(74) *Attorney, Agent, or Firm* — Locke Lord LLP; Daniel J. Fiorello; Gabrielle L. Gelozin

(57) ABSTRACT

In at least one aspect of this disclosure, a shut off valve for an ecology fuel return system can include an inlet for receiving a fluid, an outlet for effusing the fluid, and a valve member configured to move between an open position such that the valve member allows fluid to effuse from the outlet and a closed position such that the valve member prevents fluid from effusing from the outlet. The valve member can include a pressure deflector configured to prevent fluid flow from biasing the valve member toward the closed position.

9 Claims, 4 Drawing Sheets

Related U.S. Application Data continuation of application No. 14/686,888, filed on Apr. 15, 2015, now Pat. No. 9,982,602.

(51) Int. Cl.
  *F16K 31/26* (2006.01)
  *F16K 39/02* (2006.01)

(56) References Cited

U.S. PATENT DOCUMENTS

| | | | |
|---|---|---|---|
| 559,884 A | 5/1896 | Birkery | |
| 802,091 A * | 10/1905 | Anderson | F16K 17/105 |
| | | | 137/414 |
| 864,262 A | 8/1907 | Robertshaw et al. | |
| 1,522,082 A * | 1/1925 | Ruths | F01K 1/00 |
| | | | 137/583 |
| 2,037,540 A | 4/1936 | Rohlin et al. | |
| 2,616,450 A | 11/1952 | Legge et al. | |
| 3,078,867 A | 2/1963 | McGillis et al. | |
| 3,626,973 A | 12/1971 | Mason | |
| 4,719,749 A | 1/1988 | Greune et al. | |
| 5,152,315 A | 10/1992 | Lagache | |
| 5,655,888 A * | 8/1997 | Yumoto | F22D 11/06 |
| | | | 417/132 |
| 6,176,437 B1 | 1/2001 | Pedersen | |
| 6,195,978 B1 | 3/2001 | Futa, Jr. | |
| 6,314,998 B1 | 11/2001 | Futa, Jr. et al. | |
| 6,334,296 B2 | 1/2002 | Futa, Jr. et al. | |
| 6,484,510 B2 | 11/2002 | Futa, Jr. et al. | |
| 6,619,025 B2 | 9/2003 | Wernberg | |
| 6,807,801 B2 | 10/2004 | McCarty | |
| 6,877,306 B2 | 4/2005 | Wernberg et al. | |
| 7,726,112 B2 | 6/2010 | Dooley | |
| 7,967,025 B2 | 6/2011 | Kidprasert | |
| 8,029,235 B2 | 10/2011 | Lombard et al. | |
| 8,046,983 B2 | 11/2011 | Lawrence et al. | |
| 8,083,204 B2 | 12/2011 | Maker | |
| 8,122,699 B2 | 2/2012 | Lawrence et al. | |
| 8,127,524 B2 | 3/2012 | Falke et al. | |
| 8,234,875 B2 | 8/2012 | Falke et al. | |
| 8,316,630 B2 | 11/2012 | Futa et al. | |
| 8,353,306 B2 | 1/2013 | Futa et al. | |
| 8,567,201 B2 | 10/2013 | Dalton | |
| 8,596,293 B2 | 12/2013 | Mous et al. | |
| 2004/0154302 A1 | 8/2004 | Wernberg et al. | |
| 2008/0271456 A1 | 11/2008 | Scully et al. | |
| 2010/0024891 A1 | 2/2010 | Francini et al. | |
| 2012/0271527 A1 | 10/2012 | Zebrowski et al. | |

FOREIGN PATENT DOCUMENTS

| | | |
|---|---|---|
| EP | 2977846 A1 | 1/2016 |
| JP | 2014214848 A | 11/2014 |

* cited by examiner

SHUT OFF VALVES AND COMPONENTS THEREOF FOR ECOLOGY FUEL RETURN SYSTEMS

CROSS-REFERENCE TO RELATED APPLICATIONS

This application is a divisional of U.S. patent application Ser. No. 15/990,079 filed May 25, 2018 which is a continuation of and claims priority to U.S. Non-Provisional application Ser. No. 14/686,888, filed Apr. 15, 2015, the entire contents of which are herein incorporated by reference.

BACKGROUND

1. Field

The present disclosure relates to ecology fuel return systems, more specifically to shut off valves for ecology fuel return systems.

2. Description of Related Art

Recent environmental protection regulations require the prevention of spillage of any jet fuel and/or jet fuel vapors on runways during aircraft gas turbine engine operation (or after engine shutdown). Most modern aircraft gas turbine engines are equipped with an ecology fuel return system including a compact fuel tank, an ecology valve, tubing, and related components. The return-to-tank fuel ecology system is configured to remove a certain known amount of jet fuel from the engine's fuel manifolds (incl. fuel nozzles/injectors, engine fuel supply lines, and the like) upon engine shutdown. Upon engine startup, the jet fuel from the ecology fuel return system is returned to the engine's fuel pump inlet via an ejector pump to be injected in the combustor (via the fuel nozzles) thus providing stable engine idle operations.

The benefit of the ecology fuel return system is that it minimizes the amount of fuel left over in the engine's fuel system after engine shutdown, thus minimizing the possibility for any liquid fuel and/or any gaseous fuel vapor leaks into the environment. The ecology fuel return system also prevents any potential coking of the fuel manifold nozzles by scavenging the "left-over" liquid jet fuel from the system upon engine shut-down. Finally, the ecology fuel return system drains the combustor of any unused jet fuel upon engine shut-down thus preventing any smoke exhaust form the engine upon engine start-up and potentially causing some localized undesirable fuel-rich conditions in the combustor (i.e., "hot spots").

However, when a typical ecology fuel return system fails, there is a potential for air leakage into the aircraft's fuel system. Air that is entrained in jet fuel can cause air pockets and uneven jet fuel density leading to uneven jet fuel supply to the engines, potentially resulting reduced thrust power, fuel pump degradation (due to cavitation caused by air pockets), fuel pump damage (due to cavitation in the two-phase flow of gaseous air and liquid fuel) and the like.

To prevent the entrainment of continuous air flow into the fuel system, traditional ecology return systems employ a shutoff valve. This valve is connected to a float to open or close the tank outlet as a function of fluid level. The force from the float's buoyancy acts to close or open the shutoff valve for the tank outlet flow. The float of the shutoff valve is sensitive to the influence of external loads as the valve operates with low or no force margin to keep it closed.

The flow through the inlet shutoff valve creates a pressure drop across that valve that acts to drive traditional valves shut against the weight of the float. As this flow increases, the pressure drop across the valve increases to the point at which it overcomes the mass of the float and armature, thereby prematurely closing the inlet valve prior to fully draining the fuel manifold and nozzles.

Such conventional methods and systems have generally been considered satisfactory for their intended purpose. However, there is still a need in the art for improved shut off valves for ecology return systems. The present disclosure provides a solution for this need.

SUMMARY

In at least one aspect of this disclosure, a shut off valve for an ecology fuel return system can include an inlet for receiving a fluid, an outlet for effusing the fluid, and a valve member configured to move between an open position such that the valve member allows fluid to effuse from the outlet and a closed position such that the valve member prevents fluid from effusing from the outlet. The valve member can include a pressure deflector configured to prevent fluid flow from biasing the valve member toward the closed position.

The valve member can include a poppet. In certain embodiments, the valve member can include a disk body, wherein the pressure deflector extends from the disk body at an angle relative to a plane defined by the disk body. The disk body can include a seal disposed on an outlet face thereof. The valve member can be configured to connect to an armature to be actuated by a float.

The valve member can be disposed in a valve chamber configured to retain the valve member and allow the valve member to move between the open position and the closed positon. The valve chamber can include a guide structure for linearly guiding the valve member between the open and closed positions. The valve member can include a guide post configured to be received by the guide structure.

In accordance with at least one aspect of this disclosure, an ecology fuel return system for a turbomachine can include a reservoir, a float disposed within the reservoir, an armature operatively attached at one end to the float, wherein the armature is hinged about a fulcrum, and a shutoff valve as described above disposed in fluid communication with the reservoir, wherein the valve member of the shutoff valve is operatively connected to the armature at a second end thereof.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
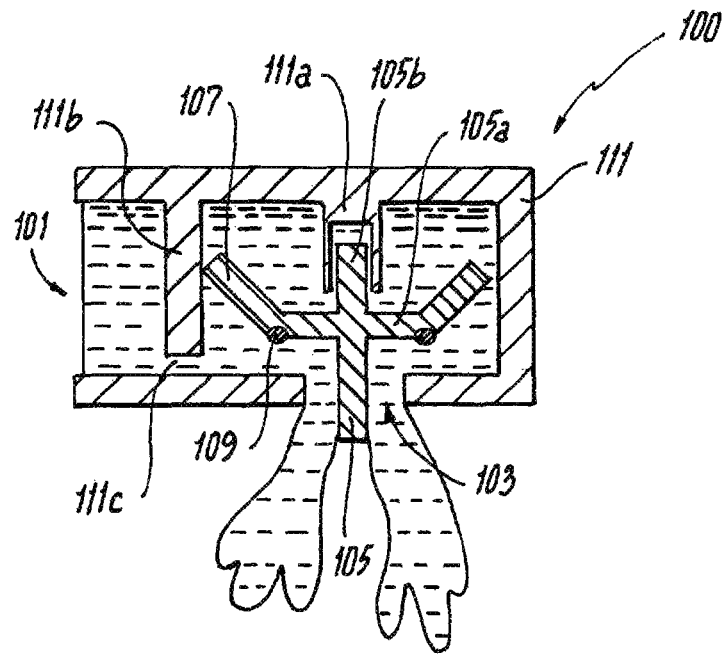
FIG. 1A is a schematic view of an embodiment of a shutoff valve in accordance with this disclosure, shown in an open position.

Reference will now be made to the drawings wherein like reference numerals identify similar structural features or aspects of the subject disclosure. For purposes of explanation and illustration, and not limitation, an illustrative view of an embodiment of a shutoff valve in accordance with the disclosure is shown in FIGS. 1A and is designated generally by reference character 100. Other embodiments and/or aspects of this disclosure are shown in FIGS. 1B-4. The systems and methods described herein can be used to prevent premature valve closure in certain systems (e.g., ecology fuel return systems).

Figure 1B:
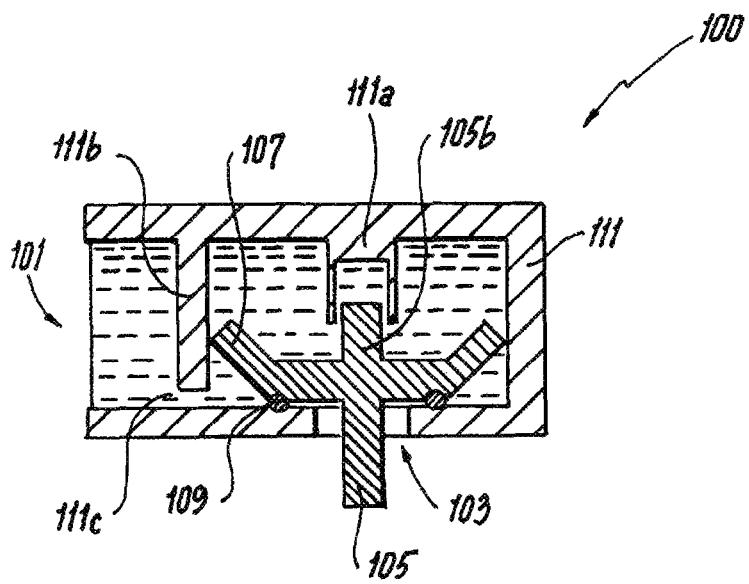
FIG. 1B is a schematic view of the shutoff valve of FIG. 1A, shown in a closed position.
Figure 4:
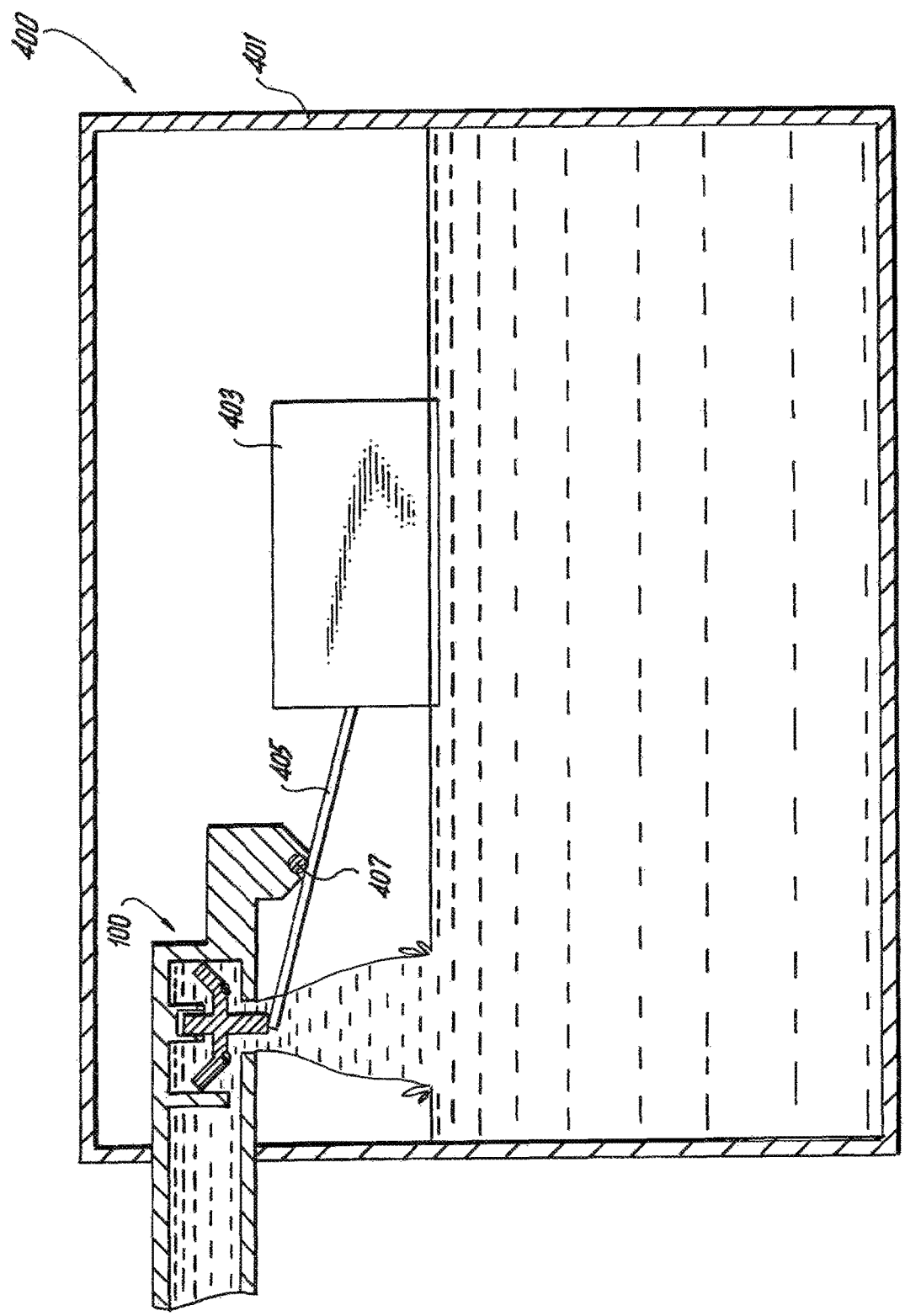
FIG. 4 is a schematic view of an ecology fuel return system in accordance with this disclosure, showing the valve of FIG. 1 disposed therein.

In at least one aspect of this disclosure, referring to FIGS. 1A and 1B, a shut off valve 100 for an ecology fuel return system (e.g., system 400 as shown in FIG. 4) can include an inlet 101 for receiving a fluid, an outlet 103 for effusing the fluid, and a valve member 105 configured to move between an open position (as shown in FIG. 1A) such that the valve member 105 allows fluid to effuse from the outlet 103 and a closed position (as shown in FIG. 1B) such that the valve member 105 prevents fluid from effusing from the outlet 103.

The valve member 105 can include a pressure deflector 107 configured to prevent fluid flow from biasing the valve member 105 toward the closed position. The pressure deflector 107 can be an integral member of the valve member 105 or any suitable attached piece. It is contemplated that the pressure deflector 107 can include one or more relief holes defined from the topside to the underside of the pressure deflector 107 to allow fluid behind the pressure deflector 107 to escape therethrough when the valve member 105 is moved from the close position to the open position. However, it is also contemplated that no relief hole is necessary if the pressure deflector 107 is not in a sealed relationship with the valve chamber 111 as described below.

As shown, the valve member 105 can include a poppet. For example, the valve member can include a disk body 105a. In certain embodiments, the pressure deflector 107 can extend from the disk body 105a at a suitable angle relative to a plane defined by the disk body 105a. The disk body 105a can include a seal 109 disposed on an outlet face thereof. The pressure deflector 107 can be annular with the disk body 105a or take any other suitable shape.

The valve member 105 can be disposed in a valve chamber 111 configured to retain the valve member 105 and allow the valve member 105 to move between the open position (FIG. 1A) and the closed positon (FIG. 1B). The valve member 105 can include a guide structure 111a for linearly guiding the valve member 105 between the open and closed positions. The valve member 105 can include a guide post 105b configured to be received by the guide structure 111a. The valve chamber 111 can also include at least one chamber wall 111b that defines a chamber inlet 111c.

As described, the valve member 105 of FIGS. 1A and 1B can allow flow therethrough in the open position without being biased to close with increasing flow rate. The increased surface area on the underside of the valve member 105 due to the pressure deflector 107 causes the forces due to fluid flow on the underside of the valve member 105 to be greater than that on the topside for a given flow rate.

Figure 2A:
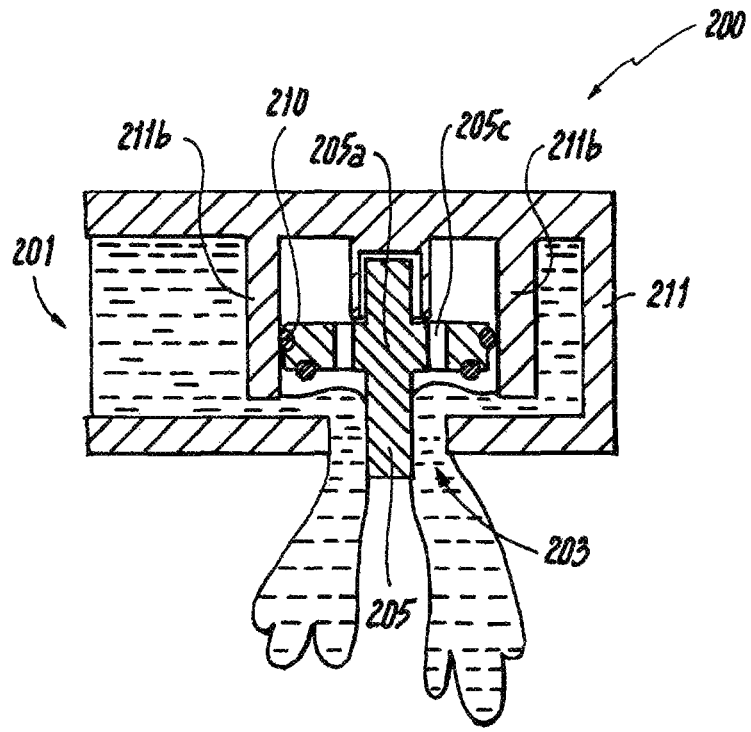
FIG. 2A is a schematic view of another embodiment of a shutoff valve in accordance with this disclosure.
Figure 2B:
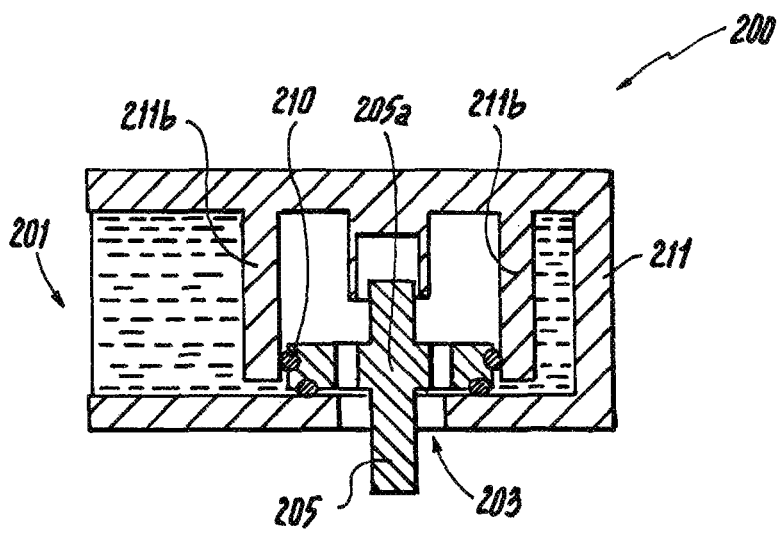
FIG. 2B is a schematic view of the shutoff valve of FIG. 2A, shown in a closed position.

Referring to FIGS. 2A and 2B, another embodiment of a shutoff valve 200 is shown. The valve 200 can include an inlet 201, an outlet 203, and a poppet valve member 205 that has a disk body 205a. The poppet valve member 205 is disposed within a valve chamber 211 and is configured to be in a sealed relationship with chamber walls 211b.

For example, a side seal 210 can be disposed on the poppet valve member 205 to prevent fluid from entering behind the poppet valve member 205. As shown, the disk body 205a can include relief holes 205c therethrough to allow air on top of the disk body 205a to escape and/or enter therethrough. The valve member 205 can include any other suitable feature or features as described herein with respect to any other embodiment described herein.

As described, the poppet valve member 205 is not biased to the closed position (FIG. 2B) by a fluid flow because the pressurized fluid cannot create a force on the top surface of the poppet valve member 205.

Figure 3A:
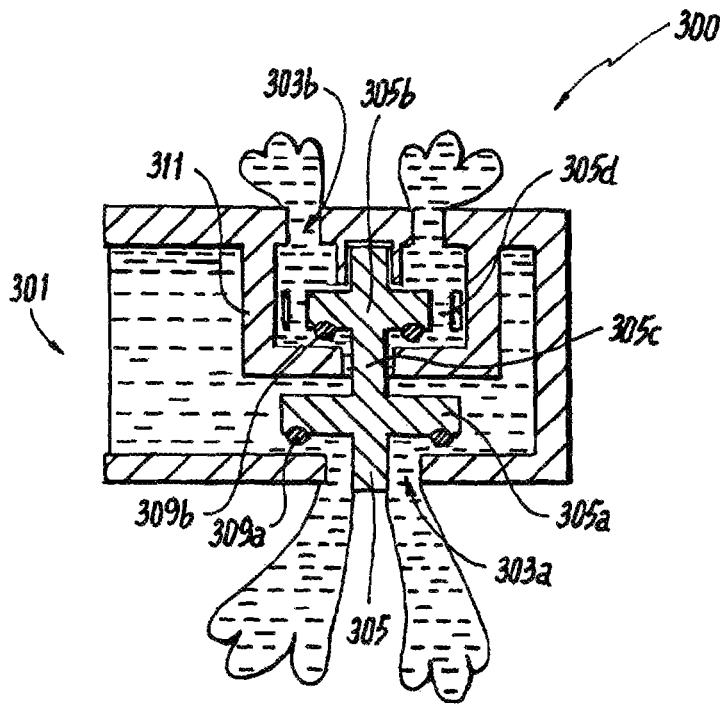
FIG. 3A is a schematic view of another embodiment of a shutoff valve in accordance with this disclosure.
Figure 3B:
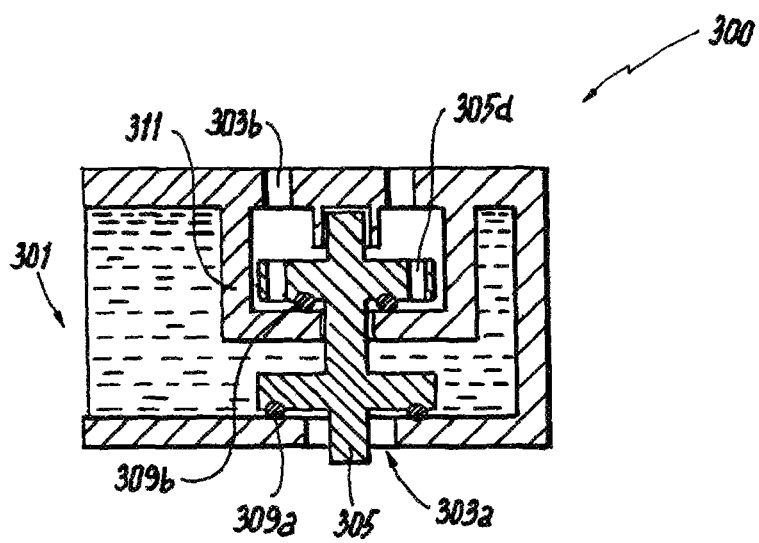
FIG. 3B is a schematic view of the shutoff valve of FIG. 3A, shown in a closed position.

Referring to FIGS. 3A and 3B, another embodiment of a shutoff valve 300 is shown. The valve 300 can include an inlet 301, a plurality of outlets 303a, 303b, and a double valve member 305 that has a first disk body 305a and a second disk body 305b connected by a shaft 305c. The first disk body 305a is disposed adjacent to the outlet 303a and is configured to prevent fluid flow (e.g., with seal 309a) from effusing from outlet 303a in the closed position.

The second disk body 305b is disposed within a valve chamber 311 and is configured to be in a sealed relationship with the valve chamber 311 (e.g., via seal 309b) when in the closed position to prevent fluid from entering the valve chamber 311, thereby preventing fluid from passing through and/or around the second disk body 305b to outlet 303b. As shown, the second disk body 305b can include one or more flow conduits (i.e. holes, slots, openings, etc.) 305d positioned downstream of the seal 309b. The double valve member 305 can include any other suitable feature or features as described herein with respect to any other embodiment.

As described, the valve member 305 prevents premature closure of the valve 300 by creating opposing forces on the first disk body 305a and the second disk body 305b when passing flow through two outlets 303a, 303b.

Referring to FIG. 4, in accordance with at least one aspect of this disclosure, an ecology fuel return system 400 for a turbomachine can include a reservoir 401, a float 403 disposed within the reservoir 401, and an armature 405 that is operatively attached at one end to the float 403. The armature can be hinged about a fulcrum 407.

A shutoff valve 100, 200, 300 as described above (in FIGS. 1A-3B, respectively) can be disposed in fluid communication with the reservoir 400. The valve member 105, 205, 305 as described above (in FIGS. 1A-3B, respectively) can be configured to connect to the armature 405 to be actuated by a float 403. For example, when the fluid level drops below a certain level, the float 403 sinks and raises the valve member 105, 205, 305 to the open position. When the fuel fills to a full level, the float 403 rises and pulls the valve members 105, 205, 305 to the closed position. Any other suitable configuration to actuate the valve member 105, 205, 305 between the open and closed positions is contemplated herein.

The methods and systems of the present disclosure, as described above and shown in the drawings, provide for shutoff valves with superior properties including premature shutoff prevention. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An ecology fuel return system for a turbomachine, comprising:
    a reservoir;
    a float disposed within the reservoir;
    an armature operatively attached at one end to the float, wherein the armature is hinged about a fulcrum; and
    a shutoff valve disposed in fluid communication with the reservoir, wherein the shutoff valve includes:
        an inlet for receiving a fluid;
        a plurality of outlets for effusing the fluid including at least a first outlet and a second outlet; and
        a double valve member having a first disk body and a second disk body connected by a shaft, wherein the double valve member is configured to move between an open position such that the double valve member allows fluid to effuse from the plurality of outlets,
    wherein the first disk body is disposed adjacent to the first outlet and is configured to prevent fluid flow from effusing from the first outlet in a closed position, and
    wherein the second disk body is disposed within a valve chamber and is configured to be in a sealed relationship with the valve chamber when in the closed position to prevent fluid from entering the valve chamber, thereby preventing fluid from passing through and/or around the second disk body to the second outlet, wherein the first disk body includes a first seal to prevent fluid from effusing from the first outlet in the closed position, wherein the double valve member prevents premature closure of the valve by creating opposing forces on the first disk body and the second disk body when passing flow through the first outlet and the second outlet,
    wherein the float and armature are configured to raise the double valve member to the open position when a fluid level in the reservoir drops below a predetermined level and pull the double valve member to the closed position when the fluid level in the reservoir raises above a predetermined level.

2. The valve of claim 1, wherein the second disk body includes a second seal to create the sealed relationship with the valve chamber.

3. The valve of claim 2, wherein the second disk body includes one or more flow conduits positioned downstream of the second seal.

4. The valve of claim 1, wherein the valve member further includes a guide structure for linearly guiding the valve member between the open and closed positions.

5. The system of claim 1, wherein the second disk body includes a second seal to create the sealed relationship with the valve chamber.

6. The system of claim 5, wherein the second disk body includes one or more flow conduits positioned downstream of the second seal.

7. The system of claim 1, wherein the valve member further includes a guide structure for linearly guiding the valve member between the open and closed positions.

8. The valve of claim 1, wherein the first outlet and the second outlet are defined in opposite sides of the valve.

9. A shut off valve for an ecology fuel return system, comprising:
    an inlet for receiving a fluid;
    a plurality of outlets for effusing the fluid including at least a first outlet and a second outlet; and
    a double valve member having a first disk body and a second disk body connected by a shaft, wherein the double valve member is configured to move between an open position such that the double valve member allows fluid to effuse from the plurality of outlets,
    wherein the first disk body is disposed adjacent to the first outlet and is configured to prevent fluid flow from effusing from the first outlet in a closed position, and
    wherein the second disk body is disposed within a valve chamber and is configured to be in a sealed relationship with the valve chamber when in the closed position to prevent fluid from entering the valve chamber, thereby preventing fluid from passing through and/or around the second disk body to the second outlet, wherein the second disk body includes one or more flow conduits defined as through-holes through the second disk body configured to permit fluid on top of the second disk body to flow from the top of the second disk body, through the one or more flow conduits and through the disk body, to a bottom of the second disk body.

* * * * *